United States Patent [19]  [11] Patent Number: 4,501,712
Heyer  [45] Date of Patent: Feb. 26, 1985

[54] VACUUM PINNING OF MOLTEN THERMOPLASTIC FILM TO A ROUGHENED CASTING ROLL

[75] Inventor: David E. Heyer, Circleville, Ohio

[73] Assignee: E. I. Du Pont de Nemours and Company, Wilmington, Del.

[21] Appl. No.: 409,877

[22] Filed: Aug. 20, 1982

[51] Int. Cl.³ .............................................. B29D 7/02
[52] U.S. Cl. .................................... 264/101; 264/216; 264/310
[58] Field of Search ................ 264/101, 102, 216, 310

[56] References Cited

U.S. PATENT DOCUMENTS

| 3,121,915 | 2/1964 | Heller, Jr. | 264/216 X |
| 3,154,608 | 10/1964 | Aronsen | 264/101 |
| 3,177,558 | 4/1965 | Gronholz et al. | 29/121 |
| 3,213,172 | 10/1965 | Hoelzer | 264/216 |
| 3,347,962 | 10/1967 | Dieck et al. | 264/90 |
| 3,374,303 | 3/1968 | Metz, Jr. | 264/216 |
| 3,520,964 | 7/1970 | Metz, Jr. | 264/90 |
| 3,734,984 | 5/1973 | Hoffman | 264/216 X |
| 3,752,731 | 8/1973 | Stiegler et al. | 161/164 |
| 4,038,354 | 7/1977 | Remmington et al. | 264/102 |
| 4,046,842 | 9/1977 | Groves et al. | 264/216 X |
| 4,255,365 | 3/1981 | Heyer | 264/216 X |
| 4,310,295 | 1/1982 | Heyer | 425/224 |

FOREIGN PATENT DOCUMENTS

| 924073 | 4/1973 | Canada | 18/169 |
| 48-2218 | 1/1973 | Japan | 264/216 |
| 48-3535 | 1/1973 | Japan | 264/216 |
| 8045349 | 12/1978 | Japan | 264/216 |
| 1302642 | 1/1973 | United Kingdom | |

Primary Examiner—Jay H. Woo
Assistant Examiner—James C. Housel

[57] ABSTRACT

A process is disclosed for increasing the casting speed in manufacturing thermoplastic film and in increasing the quality of film made thereby. The film is cast, in molten form during manufacture, by means of a vacuum, onto a quench roll (casting roll) having a surface roughness of at least 3 microinches (0.08 micrometers).

16 Claims, 3 Drawing Figures

VACUUM PINNING OF MOLTEN THERMOPLASTIC FILM TO A ROUGHENED CASTING ROLL

BACKGROUND

The subject invention relates to the extrusion of molten thermoplastic film onto a quench roll casting drum.

In the production of film from certain thermoplastic polymers in which such film is formed at temperatures above or near the polymer melting point, it is important to quickly cool the freshly formed film to a temperature below the second order transition temperature, i.e., that temperature at which, as temperature decreases, the polymer goes from a flexible state to a more rigid, glassy state, in order to prevent crystallization which would interfere with subsequent orientation of the film. It is, therefore, important to achieve quick, intimate contact between the extruded film and the quench roll, hence preventing excess air from being trapped between the film and the roll. A number of devices have been employed to create more initmate contact between the extruded film and the quench roll, the most prominent being, generally, forced air pinning, electrostatic pinning, and vacuum pinning. Forced air pinning, where the molten film is urged against the quench roll by means of air pressure exerted against the upper, or leading surface of the extruded film, is of limited use during high speed operation due to inherent limitations in the magnitude of air pressure which can be applied to a film with low melt tensions. Electrostatic pinning, where the extruded film is held to the quench roll by means of electrostatic forces, has also been limited to slower operation as air bubbles are trapped under the film at high speeds.

In the recent past, the removal of air proximate the line of contact between the extruded film and the quench roll has been attempted by use of various vacuum box devices, for example, the vacuum devices disclosed in U.S. Pat. No. 3,347,962 (Dieck et al) and U.S. Pat. No. 4,310,295 (Heyer), the latter hereby incorporated by reference. A major limitation of such vacuum devices, however, is the narrow operating range of vacuum levels that can be exerted on the lower, or trailing surface of the molten film for any given casting speed, particularly in the manufacture of thin gauge films. As detailed below, a variation in vacuum levels or variation in casting speed outside of this delicate operating range results in dramatic irregularities in cast film quality.

SUMMARY OF THE INVENTION

The subject invention is a process for the preparation of thermoplastic polymeric film comprising extruding a web of said polymeric material in melt form onto a quench roll having a surface roughness of at least three microinches (0.08 micrometers) while simultaneously applying a vacuum force to the line of contact between the web and the roll thereby preventing excess air from being entrapped between the film and the roll.

DETAILED DESCRIPTION

Figure 1:
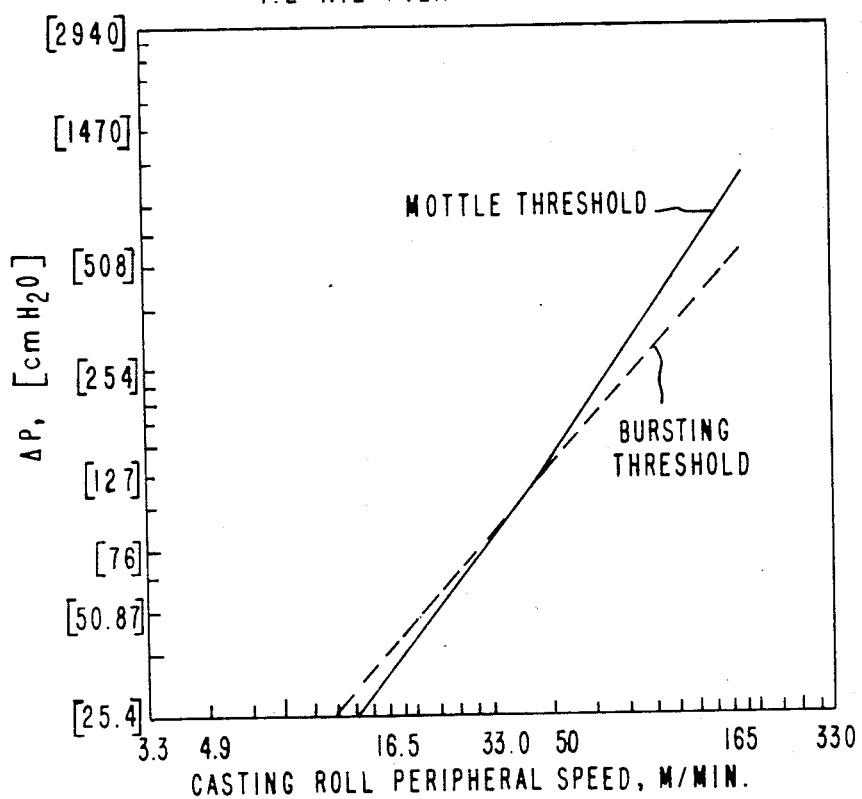
FIG. 1 is a log/log graph of the ranges of vacuum level vs. quench roll (casting roll) peripheral speed useful in the vacuum assisted casting of 7.2 mil (183 micrometers) molten thermoplastic film onto a highly polished quench roll (unless otherwise specified, all film thicknesses herein are as cast film thicknesses).

The subject invention is a process for the preparation of thermoplastic polymeric film comprising extruding a web of said polymeric material in melt form onto a quench roll having a surface roughness of at least 3 microinches (0.08 micrometers) while simultaneously applying a vacuum force to the line of contact between the web and the roll.

Of the various vacuum box devices available in the art for assisting the casting of molten thermoplastic film onto a quench roll, the device depicted in the figures and detailed in the disclosure of U.S. Pat. No. 4,310,295 is preferred for purposes of the subject invention due to the quiescent nature of the vacuum forces applied thereby to the trailing face of the film proximate the line of contact between the film and the quench roll. Of course, any other of the many vacuum devices well known in the art useful in eliminating air from the line of contact between the film and the quench roll can be employed as well in the practice of the subject invention.

The process of the subject invention can be utilized for casting any thermoplastic polymer film which is capable of being melt casted in film form. For example, such polymers include polyesters such as polyethylene terephthalate, polyethylene-2,6-naphthalate, polytetramethylene-1,2-dioxybenzoate and polyethylene-1,5-naphthanate; polyamides such as polyhexamethylene adipamide, polyhexamethylene sebacamide and polycaproamide; and vinylidene chloride. While the above polymeric materials are generally crystallizable, the invention is equally applicable to those organic thermoplastic polymers which are normally amorphous and which do not crystallize, such as polystyrene and polymethyl methacrylate.

Of critical impact in the process of the subject invention is the nature of the surface of the quench roll. Vacuum devices have heretofore been utilized in conjunction with smooth surfaced quench rolls, the surfaces of these rolls more conventionally referred to as highly polished surfaces, whereas the process of the subject invention utilizes a quench roll having a roughened surface. Processes useful to roughen the surface of processing rolls are well known and include surface grinding and bead blasting. The former is accomplished by conventional grinding tools capable of forming continuous or non-continuous circumferential grooves in the surface of the roll. The latter is accomplished by blasting hard, particulate matter, preferably spherical glass beads, against the surface of the roll, for example, using conventional air pressure blasting equipment. After grinding or blasting, the surface of the roll may be polished to remove sharp, irregular edges from the newly formed surface grooves or pits. Blasted surfaces are preferred for use in the practice of the subject invention because the roughness created thereby is two-dimensional comprised of interconnecting pits which allows multiple escape paths for any air entrapped between the film and the surface of the roll. In contrast, the roughness on ground surfaces is one-dimensional comprised of circumferential grooves which allows only one escape path for air entrapped between the film and the surface of the roll. More importantly, there exists more points of contact between the extruded web and a quench roll having a blasted surface as compared to one having a ground surface.

The degree of roughness on the surface of the roll is also critical in the practice of the subject invention. Surface roughness is conventionally measured in microinches, herein specified as an Arithmetic Average (AA), as detailed in the ISA Journal 10 p. 51-56 (February, 1963) herein incorporated by reference. The lower limit of the operable roughness for purposes of the subject invention is 3 microinches (0.08 micrometers) In theory, there is no upper limit as to the degree of operable roughness for purposes of the subject invention. For practical purposes, however, to avoid detrimental film surface irregularities, the roughness of the quench roll surface should be between 3 and 64 microinches (0.08-1.6 micrometers), preferably 3 to 32 microinches (0.08 to 0.8 micrometers), and most preferably 4 to 16 microinches (0.1 to 0.4 micrometers). This latter range ensures that any surfafce irregularities on the surface of the cast film will have a narrow size distribution, an important quality if the film is to be useful in microfilm applications or as a computer, audio or video base film.

Figure 2:
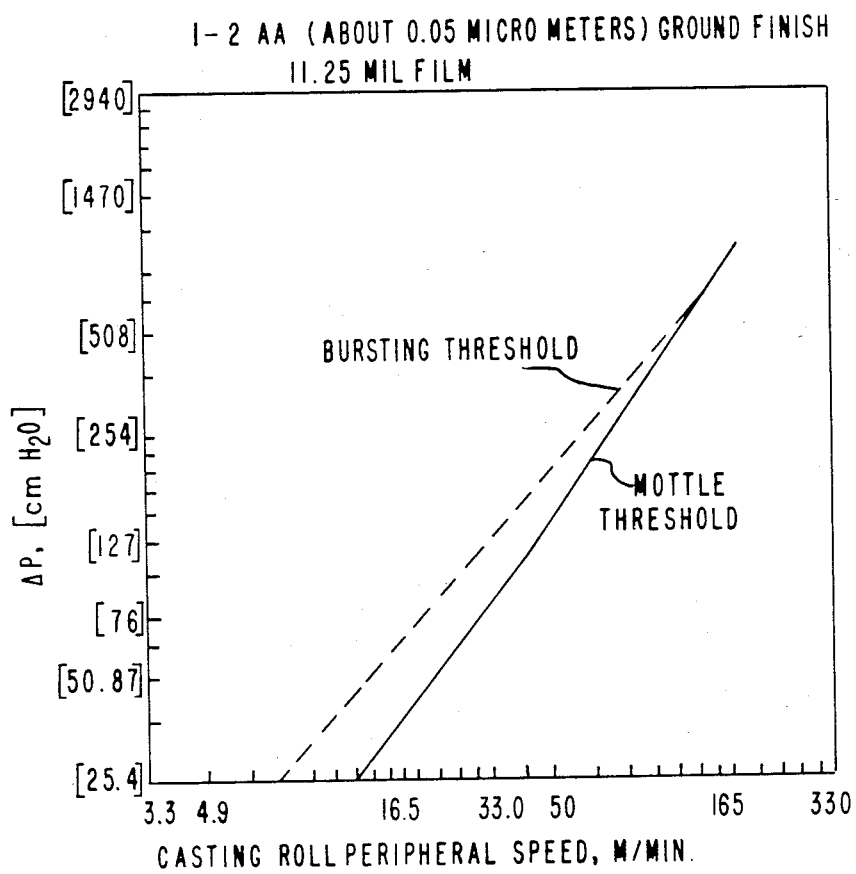
FIG. 2 is a log/log graph of the ranges of vacuum level vs. quench roll (casting roll) peripheral speed useful in the vacuum assisted casting of 11.25 mil (286 micrometers) molten thermoplastic film onto a highly polished quench roll.

The surprising discovery resulting from utilization of a roughened quench roll in conjunction with vacuum assisted film casting is two-fold. First, the "mottle" threshold is lowered. Mottle manifests itself when there is incomplete contact of the film with the surface of the quench roll. The few points on the film surface that do come into intimate contact with the quench roll during mottle cause dimples to be formed on the opposite surface of the film, that film surface thereby resembling the surface of an orange peel. Second, the "bursting" threshold is raised. "Bursting" relates to the use of vacuum assisted film casting and is simply the result of too high a vacuum force exerted on the trailing surface of an extruded film at the line of contact between the film and the quench roll, causing the film to be drawn toward the vacuum device and away from the quench roll surface. In operating any of the vacuum devices disclosed in the art, a balance need be struck such that, at any given roll speed, there is sufficient vacuum force applied to the line of contact between the film and the quench roll to prevent excess air from being entrapped between the film and the roll (i.e., to prevent mottle), but not so high a vacuum force that the film is pulled toward the vacuum device away from the quench roll (i.e., to prevent bursting). As will be seen in the Example below, the operating range, or window, within which this balance is struck is very narrow when utilizing vacuum assisted casting and a highly polished quench roll, particularly in the manufacture of thin gauge films. In contrast, when a quench roll having a roughened surface is utilized in conjunction with any of the prior art vacuum devices, the mottle threshold is lowered and the bursting threshold is raised thereby drastically enlarging the operating window which defines the conditions under which a thermoplastic film may be cast, as illustrated in FIGS. 1 and 2 and more fully detailed in the Example.

In addition to lowering the mottle threshold and raising the bursting threshold in a vacuum assisted casting process, the subject invention allows thin gauge films to be produced which both could never have been produced heretofore on continuous processing lines, and could not have been heretofore produced at commercially acceptable speeds. Surprisingly, films having cast thicknesses of between about 4 and 10 mils (100-250 micrometers) can be produced by the process of the subject invention at peripheral quench roll speeds of greater than about 125 ft/min (38 m/min), and films having cast thicknesses of between about 10 and 15 mils (250-380 micrometers) can be produced by the process of the subject invention at peripheral quench roll speeds of greater than about 150 ft/min (46 m/min). Such thin film production has heretofore been unattainable using vacuum assisted casting on highly polished quench rolls.

The attributes of the subject invention will be more fully appreciated by reference to the following Example.

EXAMPLE

For control purposes, polyethylene terephthalate having an intrinsic viscosity of 0.51-0.52 was melt extruded in film form from a conventional 0.070-0.090 inch (1.8-2.3 mm) slit die and cast onto a quench roll having a highly polished (1-2 AA) surface spaced 0.125 inches (3.2 mm) from the die lip. This casting was assisted by a vacuum device as depicted in the Figures of U.S. Pat. No. 4,310,295. By varying both the vacuum pressure and the quench roll speed, the mottle threshold and bursting threshold were determined empirically for 7.2 mil (183 micrometer) film and 11.25 mil (286 micrometer) film (as cast), the results graphically illustrated in FIG. 1 and FIG. 2 respectively.

Figure 3:
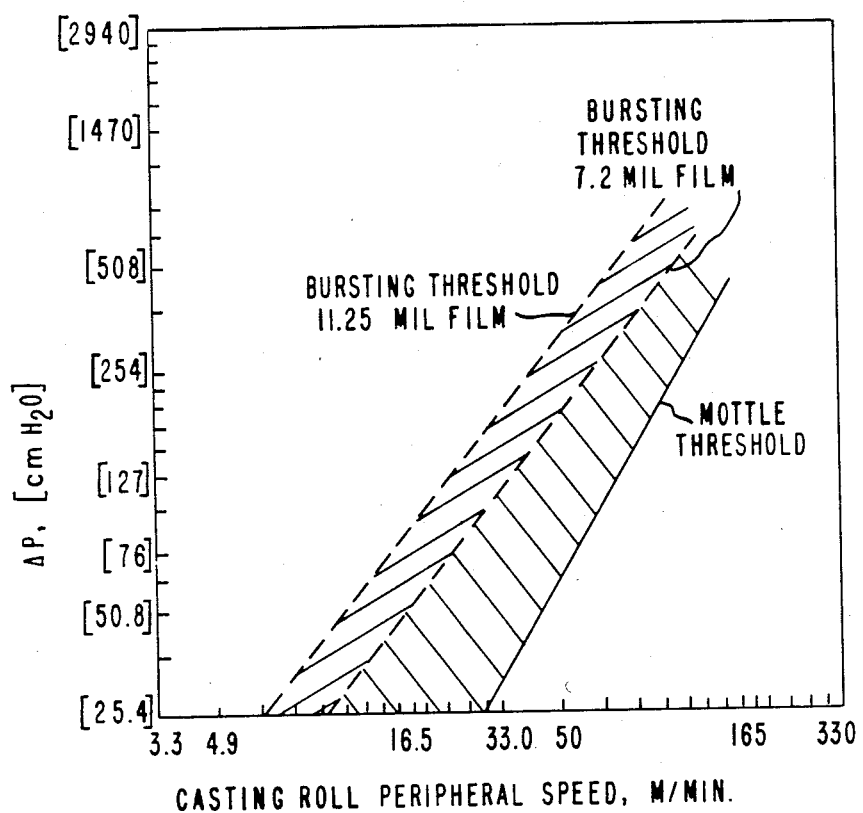
FIG. 3 is a log/log graph of the ranges of vacuum level vs. quench roll (casting roll) peripheral speed useful in the vacuum assisted casting of both 7.2 and 11.25 mil molten thermoplastic film onto a quench roll having a glass bead-blasted surface roughness of 6-7 microinches (0.15-0.18 micrometers).

Thereafter, to illustrate the benefits of the subject invention, polyethylene terephthalate having an intrinsic viscosity of 0.52-0.545 was melt extruded in film form from a conventional 0.09 inch (2.3 mm) slit die and cast onto a quench roll having a surface roughness of 6-7 AA. The mottle and bursting thresholds were again determined empirically for 7.2 and 11.25 mil films, the results graphically illustrated in FIG. 3.

It is apparent that the operating window for the process utilizing vacuum assisted casting had a roughened quench roll is surprisingly larger than that evidenced utilizing vacuum assisted casting and a highly polished quench roll. It is also apparent that, by utilizing the process of the subject invention, thin gauge films can be produced at high commercial rates heretofore unattainable.

I claim:

1. A process for preparing thermoplastic polymeric film comprising extruding a web of said polymeric material in melt form and casting the web onto the surface of a quench roll having a surface roughness of at least three microinches (0.08 micrometers) and yielding a line of contact between the web and the quench roll while simultaneously applying a vacuum force to the line of contact between the web and the roll thereby preventing air from being entrapped between the film and the roll.

2. The process of claim 1 wherein the polymeric film is of polyethylene terephthalate.

3. The process of claim 1 wherein the surface roughness of the quench roll is 3 to 64 microinches (0.08 to 1.6 micrometers).

4. The process of claim 3 wherein the polymeric film is of polyethylene terephthalate.

5. The process of claim 1 wherein the surface roughness of the quench roll is 3 to 32 microinches (0.08 to 0.8 micrometers).

6. The process of claim 5 wherein the polymeric film is of polyethylene terephthalate.

7. The process of claim 1 wherein the surface roughness of the quench roll is 4 to 16 microinches (0.1 to 0.4 micrometers).

8. The process of claim 7 wherein the polymeric film is of polyethylene terephthalate.

9. The process of claim 1, 2, 3, 4, 5, 6, 7 or 8 wherein the roughness comprises interconnecting pits on the surface of the roll.

10. The process of claim 1, 2, 3, 4, 5, 6, 7 or 8 wherein the roughness comprises circumferential grooves on the surface of the roll.

11. The process of claim 9 wherein the web, once cast onto the surface of a quench roll, has a thickness between about 100 and 250 micrometers.

12. The process of claim 9 wherein the web, once cast onto the surface of a quench roll, has a thickness between about 250 and 380 micrometers.

13. The process of claim 10 wherein the web, once cast onto the surface of a quench roll, has a thickness between about 100 and 250 micrometers.

14. The process of claim 10 wherein the web, once case onto the surface of a quench roll, has a thickness between about 250 and 380 micrometers.

15. The process of claim 11 wherein the roll has a peripheral speed greater than about 38 m/min.

16. The process of claim 12 wherein the roll has a peripheral speed greater than about 46 m/min.

* * * * *